United States Patent [19]

Christopher

[11] 3,784,857

[45] Jan. 8, 1974

[54] TELEVISION DEFLECTION CIRCUIT WITH LOW POWER REQUIREMENT

[75] Inventor: Todd J. Christopher, Indianapolis, Ind.

[73] Assignee: RCA Corporation, New York, N.Y.

[22] Filed: Aug. 16, 1972

[21] Appl. No.: 281,191

[52] U.S. Cl. .......... 315/27 TD
[51] Int. Cl. .......... H01j 29/70
[58] Field of Search .......... 315/27 R, 27 TD, 315/25, 26, 28

[56] References Cited

UNITED STATES PATENTS 3,440,485 4/1969 Nix, Jr. et al. .......... 315/27 R
3,111,603 11/1963 Marshall, Jr. et al. .......... 315/27 TD
3,395,313 7/1968 Rogers .......... 315/27

*Primary Examiner*—Maynard R. Wilbur
*Assistant Examiner*—J. M. Potenza
*Attorney*—Eugene M. Whitacre et al.

[57] ABSTRACT

A deflection circuit in which the retrace pulse rises above the circuit supply voltage and which pulse is recovered for providing energy for the deflection circuit.

9 Claims, 7 Drawing Figures

TELEVISION DEFLECTION CIRCUIT WITH LOW POWER REQUIREMENT

BACKGROUND OF THE INVENTION

Figure 1:
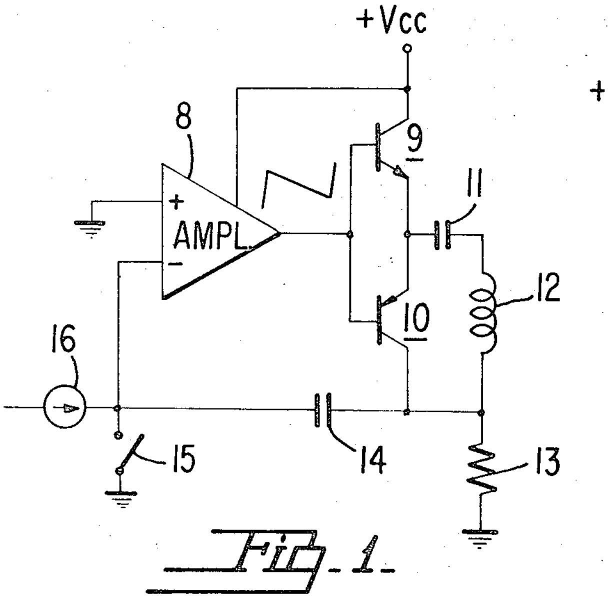

This invention relates to deflection circuits in which the retrace pulse is recovered to provide energy for the deflection circuit.

In television receivers it is desirable to minimize the power requirements of the operating circuits. To this end it is customary in horizontal deflection circuits to utilize reaction scan principles to utilize the negative current through the horizontal deflection winding during the trace interval of a horizontal scanning interval to provide a source of potential which adds to the receiver power supply potential to provide the desired operating potential for the horizontal output stage supplying the positive portion of deflection coil current. This type of arrangement supplies a "B-boost" voltage to the receiver power supply to accomplish this.

Additionally, the retrace voltage pulse, occurring at the end of one trace scan interval and before the start of the next trace interval, and caused by the abrupt cessation of trace scanning current through the horizontal deflection coils, is utilized for providing the high voltage ultor voltage requirements of the picture tube. This is accomplished by stepping up the retrace pulse voltage through a tertiary winding associated with the horizontal output or flyback transformer that couples the horizontal scanning output stage to the horizontal deflection windings. In this manner great efficiency is obtained in that the input power requirement of the television receiver is substantially reduced.

The vertical deflection circuit of a television receiver consumes a substantial amount of operating power, and, together with the horizontal deflection circuit, consumes the greater amount of power required by the television receiver. Therefore, it is desirable that the vertical deflection circuit power requirements of a television receiver by reduced as much as possible.

Accordingly, it is an object of this invention to provide a television deflection circuit in which the television receiver power supply requirements are reduced.

In accordance with the invention a deflection circuit is provided in which retrace pulse energy is recovered for providing operating power to the deflection circuit. An amplifier stage providing deflection scanning current includes two transistors serially coupled between a source of operating potential and a point of reference potential. A deflection winding is coupled to an output terminal formed by the junction of the two transistors. A first unidirectional current conducting device is coupled between the two transistors and the source of operating potential and poled to supply operating current to the amplifier. A second unidirectional current conducting device is coupled from the output terminal to the terminal of the first unidirectional device remote from the source of operating potential. Energy storage means are coupled from this last-mentioned junction to a point of reference potential. A deflection signal source provides signals coupled to the input electrodes of the transistors for controlling them for defining trace and retrace intervals of the deflection cycle. During a first portion of the retrace interval, the retrace pulse developed across the deflection winding is passed by the second unidirectional current conducting device and stored in the energy storage means. During a second portion of the trace interval, this stored energy is returned to the deflection circuit.

Figure 2A:
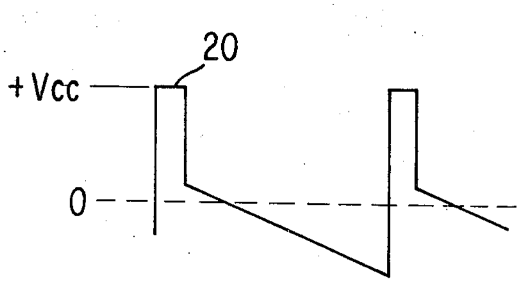
Figure 2B:
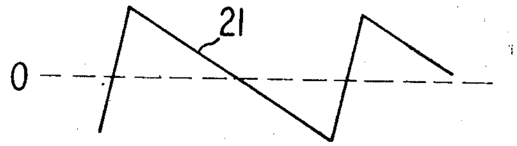
Figures 3, 4A, 4B:
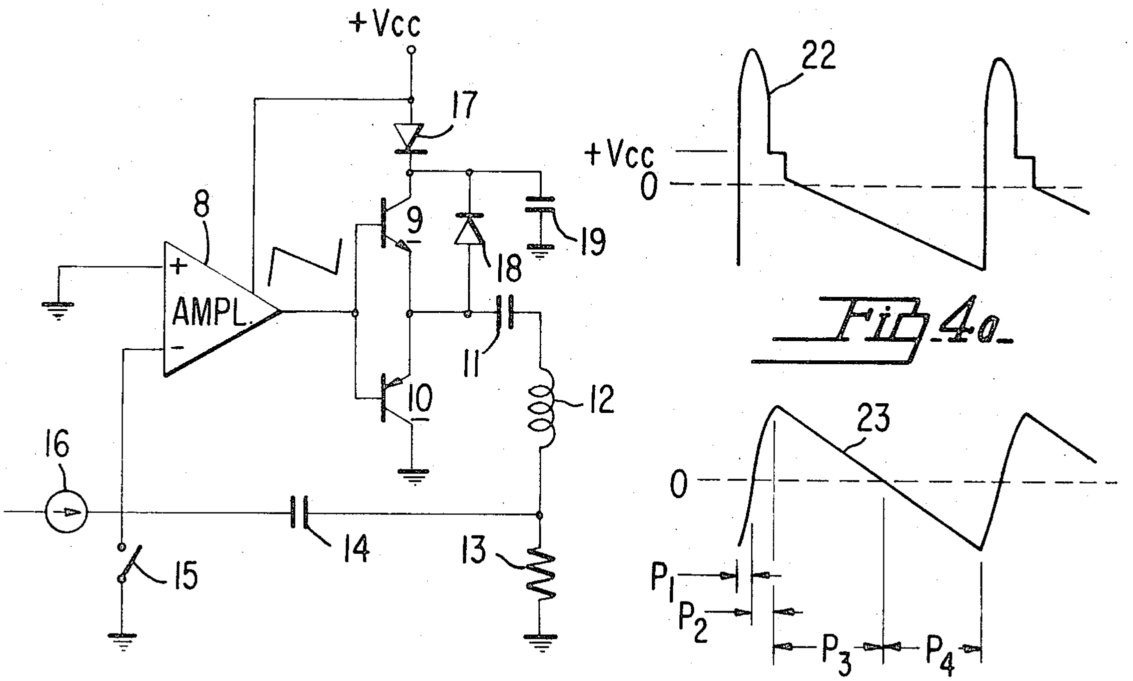
Figure 5:
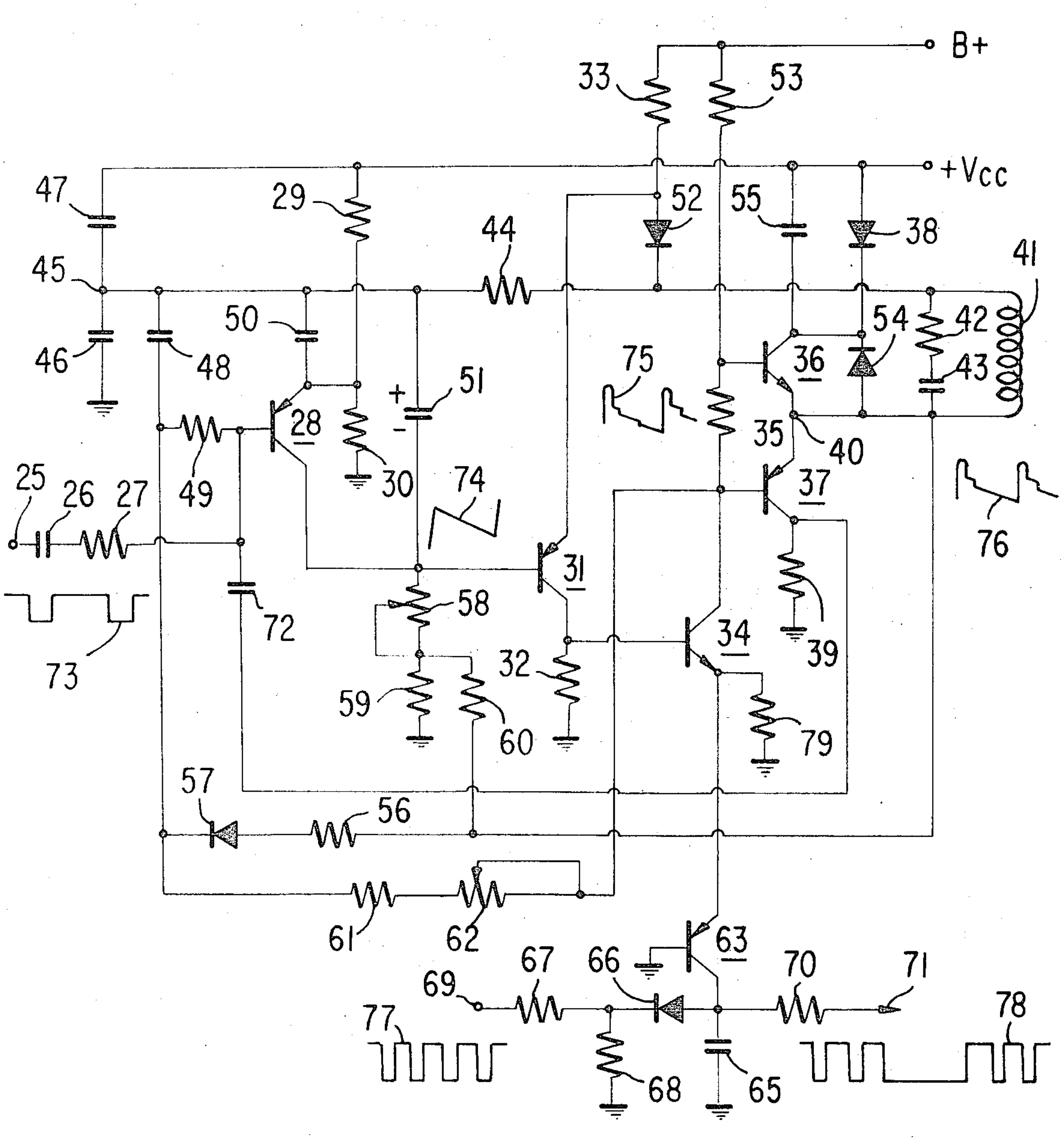

A more detailed description of the invention is given in the following specification and accompanying drawings of which:

FIG. 1 is a diagram of a prior art deflection circuit;

FIGS. 2*a* and 2*b* illustrate waveforms associated with the circuit of FIG. 1;

FIG. 3 is a diagram of a deflection circuit embodying the invention;

FIGS. 4*a* and 4*b* illustrate waveforms associated with the circuit of FIG. 3; and FIG. 5 is a schematic diagram of a vertical deflection circuit embodying the invention.

DESCRIPTION OF THE INVENTION

FIG. 1 is a diagram of a prior art deflection circuit utilizing a complementary symmetry transistor amplifier transformerless coupled to a deflection yoke. A pair of opposite conductivity type transistors 9 and 10 have their main conduction paths serially coupled between a voltage source $+V_{cc}$ and ground. An output terminal formed at the junction of the emitter electrodes of the two transistors is coupled through a coupling capacitor 11 to a deflection winding 12. The other end of deflection winding 12 is coupled through a feedback resistor 13 to ground. The junction of deflection winding 12 and resistor 13 is coupled through a capacitor 14 to the junction of a switch 15, a current source 16, and an input terminal of an amplifier 8. The voltage developed across feedback resistor 13 is proportional to the deflection winding current and supplies parallel current feedback to amplifier 8.

At the start of the trace interval of a deflection scanning cycle, switch 15 is open and capacitor 14 is charged from the current source 16. Amplifier 8 provides the necessary linear loop gain for operation and reproduces the negative-going sawtooth of voltage due to the charging of capacitor 14 at its output terminal. The sawtooth drive waveform is coupled to the two base electrodes of transistors 9 and 10. During the positive portion of the sawtooth ramp, transistor 9 conducts charging capacitor 11 and storing energy in the deflection winding 12. During the negative-going portion of the sawtooth ramp, transistor 9 is cut off and transistor 10 conducts providing a discharge path to ground for capacitor 11, reversing the flow of scanning current in deflection winding 12. Amplifier 8 compares the voltage across capacitor 14 with the feedback voltage developed across resistor 13 and supplies the necessary corrections to its output waveform to ensure the desired degree of linearity of the sweep.

At the end of the ramp portion of the sawtooth waveform, switch 15 is closed, discharging capacitor 14 very quickly. This abrupt discharge of capacitor 14 and the termination of the negative-going ramp portion of the sawtooth drive waveform causes the current in deflection winding 12 to suddenly decrease. The sudden collapse of the magnetic field generated by the sawtooth waveform in winding 12 causes a sudden large positive rise in the voltage waveform developed across deflection winding 12. The voltage across winding 12 is illustrated by the waveform 20 in FIG. 2*a*. FIG. 2*b* illustrates the current waveform 21 through deflection winding 12.

The sudden rise in yoke voltage during the retrace portion of the deflection cycle caused by the closing of switch 15 is coupled through the emitter-base junction of transistor 10 and the base-collector junction of transistor 9 to the $+V_{cc}$ supply. With this arrangement the retrace voltage portion of waveform 20 can never rise above the $+V_{cc}$ supply.

In FIG. 2*a* the voltage waveform 20 required to drive deflection winding 12 is comprised of two parts. The sawtooth component is due to the sawtooth deflection winding current and the winding resistance. The remaining pulse part of waveform 20 is required to reverse the current in winding 12 during the retrace interval. The relative time period of the pulse and sawtooth components depend on the ratio of the deflection winding L/R time constant to the desired retrace time interval.

Utilization of a saddle-type deflection coil for the winding 12 would provide a time constant on the order of 1 millisecond. However, for economic reasons it is sometimes desirable to utilize a deflection yoke including toroidally wound deflection windings. A toroidal deflection winding has a typical time constant in the order of 2–3 milliseconds. The required standard television retrace time interval is normally less than 1 millisecond. Thus, with a toroidal vertical deflection winding, the retrace portion of a yoke waveform must be two–three times as great as is the case for the saddle yoke for providing the same change in current for a limited retrace voltage across the toroidal winding and the saddle type winding.

As described above, the peak-to-peak yoke voltage in the circuit of FIG. 1 is limited by the $+V_{cc}$ supply. Therefore, the supply voltage for a 3 millisecond toroidal winding would have to be more than double that required for a 1 millisecond saddle winding having the same resistance. The current requirements for the saddle type and toroidal windings are not significantly different, and the current drawn from the power supply is roughly the same for each type winding. Therefore, when a 3 millisecond toroidal winding is utilized, more than twice as much power is drawn by the circuit and nearly three times as much power must be dissipated in the output devices due to the large supply voltage across the transistors, although the power in the deflection winding is the same. The solution to the problems of a high supply voltage and the high dissipation requirement of transistors utilized with a toroidal winding is shown in the circuit of FIG. 3.

FIG. 3 is a diagram of a deflection circuit embodying the invention. Those components in FIG. 3 performing the same function as in the circuit of FIG. 1 are indicated by the same reference numerals. The complementary symmetry transistor amplifier providing scanning current for a deflection winding 12 in FIG. 3 is the same as in FIG. 1 with the exception of additional circuitry for allowing the retrace pulse to rise higher than the $+V_{cc}$ supply and circuitry for recovering some of the retrace pulse energy and returning it to the deflection circuit during the retrace interval of each deflection cycle. A diode 17 in the main conduction path of transistors 9 and 10 is coupled between the $+V_{cc}$ supply and the collector electrode of transistor 9. This diode is poled to conduct normal operating current from the $+V_{cc}$ supply to the amplifier. However, during the retrace pulse portion of each retrace interval, the positive excursion of the retrace pulse is permitted to rise above the potential of the $+V_{cc}$ supply because the diode 17 prevents limiting of the pulse at the supply voltage by effectively disconnecting the supply from the positive rising pulse generated across the deflection winding 12. Diode 17 in the circuit for this purpose is similar to the arrangement described in U.S. Pat. No. 3,111,603 granted to T. G. Marshall et al. and entitled "TELEVISION DEFLECTION CIRCUIT."

Additionally, diode 18 and capacitor 19 are utilized to recover a portion of the high voltage retrace pulse energy. Diode 18 is coupled across transistor 9, having its anode coupled to the emitter of transistor 9 and its cathode coupled to the collector of the transistor. A retrace capacitor 19 is coupled from the cathode of diode 18 to ground. It should be noted that capacitor 19 could be returned to the $+V_{cc}$ supply instead of ground. Capacitor 19 is selected to resonate with deflection winding 12 during the retrace pulse. During the first half of ringing at the start of the positive retrace pulse, which is shown by waveform 22 in FIG. 4*a*, the deflection winding current which had been flowing from capacitor 11 through transistor 10 flows through diode 18 in the forward direction and charges capacitor 19 to the relatively high retrace pulse voltage. During the second half of ringing, capacitor 19 discharges through transistor 9 and capacitor 11, transferring the energy back into the deflection winding. This recovered energy, utilizing the high voltgage pulse energy, is utilized to change the deflection winding current direction in the required 1 millisecond retrace interval. It should be noted that the effectiveness of this arrangement depends on having a relatively low loss ringing circuit; that is, the circuit must be more reactive than resistive. The toroidal yoke which presented the initial problem because of its relatively long time constant of 2–3 milliseconds possesses the relatively high L/R ratio which provides the low loss ringing characteristic. Because of some losses due to the resistance in the circuit, not all of the retrace pulse energy is recovered, and following the half cycle of resonant ringing, transistor 9 remains saturated for a short period until the yoke current reaches the proper value. At this time the normal sawtooth trace interval begins.

Referring to the waveform 22 of FIG. 4*a*, the rounded portion at the top of the retrace pulse is due to the ringing of the circuit whereby capacitor 19 is first charged and then discharged. The step in the pulse waveform is at the voltage level of $+V_{cc}$. The retrace pulse remains at this level until the yoke current rises to the value where the normal sawtooth trace interval begins. The deflection winding current is illustrated by waveform 23 in FIG. 4*b*. The current waveform 23 is divided into four periods during each deflection cycle, the periods denoting which components in the circuit of FIG. 3 are conducting for providing the deflection winding current at that time. During the period $P_1$ which corresponds in time to the start of the positive retrace voltage pulse, diode 18 is conducting charging capacitor 19. During period $P_2$ which corresponds to the second half of the ringing retrace pulse voltage, transistor 9 is conducting, discharging capacitor 19 and reversing the deflection winding current. During period $P_3$ which is the first portion of the trace interval, transistor 9 is conducting through diode 17 charging capacitor 11. During the period $P_4$ which is the remaining portion of the trace interval, transistor 10 is conducting, at which time the deflection winding current reverses and coupling capacitor 11 discharges through transistor 10.

It should be noted that, when capacitor 19 is being charged to the high retrace pulse voltage through diode 18, there is no high voltage across transistor 9 because it is effectively bypassed by conducting diode 18. Also, deflection winding current is not flowing in transistor 10 at the time of the retrace pulse. Similarly, the discharge of capacitor 19 through transistor 9 in the forward conduction direction saturates transistor 9, a condition in which very little voltage is developed across transistor 9, and the retrace pulse is developed across transistor 10 in the absence of current flow. In this manner the retrace pulse voltage recovery circuit enables the use of a relatively low voltage $+V_{cc}$ supply and still enables an economical long time constant deflection winding to be utilized and still maintain the desired 1 millisecond retrace interval. Additionally, the circuit reduces high dissipation in the output transistors and thereby enables the use of lower power rated transistors, resulting in significant cost savings in the manufacture of a television receiver embodying the inventive circuit.

It should be noted in FIG. 3 that the collector electrode of transistor 10 is returned to ground. However, it is to be understood that the collector electrode of transistor 10 could be returned to a negative voltage power supply as well with suitable biasing arrangements provided for the input electrodes of transistors 9 and 10. Furthermore, it is within the scope of the invention to utilize other transistor amplifier arrangements than the complementary symmetry arrangement shown in FIG. 3. For example, a quasi-complementary symmetry arrangement could be utilized with a drive signal inverting transistor coupled between amplifier 8 and the input electrode of one of transistors 9 and 10. In this manner transistors 9 and 10 could be of the same conductivity type.

FIG. 5 is a diagram of a self-oscillating television receiver vertical deflection circuit embodying the invention. A source of negative vertical sync signals 73, such as obtained from a sync separator stage, not shown, of a television receiver is coupled to an input terminal 25 and through a capacitor 26 and resistor 27 to the base electrode of transistor 28 of an overdriven phase-shift type oscillator stage. Resistors 29 and 30, the junction of which is coupled to the emitter electrode of transistor 28, are serially coupled between a source of potential $+V_{cc}$ and ground for providing bias for the transistor. The collector electrode of transistor 28 is coupled to the junction of a capacitor 51, series connected potentiometer 58 and resistor 59 coupled to ground, and to the base electrode of a transistor 31. Capacitor 51 charges to the polarity indicated through resistors 58 and 59 and the output stages of the deflection circuit to provide a negative-going sawtooth wave 74. Potentiometer 58 controls the charging rate of capacitor 51 and thus serves as a height control.

Transistor 31 is utilized in an amplifying stage, its collector electrode being coupled through a resistor 32 to ground and its emitter electrode being coupled through a resistor 33 to a source of potential B+, which supplies a more positive voltage than the voltage source $+V_{cc}$. B+ is +115 volts DC and $+V_{cc}$ is +18 volts DC. The collector electrode of transistor 31 is coupled to the base electrode of a transistor 34 also utilized in an amplifying stage. The collector of transistor 34 supplies a negative-going sawtooth waveform 75 to the base electrode of transistor 37 and through a resistor 35 to the base electrode of transistor 36. Resistor 35 serves to reduce any crossover distortion between transistors 37 and 36. The emitter electrode of transistor 34 is returned to ground through a resistor 79.

Transistors 36 and 37 are connected to form a substantially class B complementary symmetry push-pull amplifier, supplying scanning current to the vertical deflection winding 41. The collector electrode of transistor 36 is coupled through a diode 38 to the $+V_{cc}$ supply and its emitter electrode is coupled to the emitter electrode of transistor 37. The collector electrode of transistor 37 is coupled through a current sampling resistor to ground. The junction of the emitter electrodes of transistors 36 and 37 form an output terminal 40. The output terminal 40 is coupled to a vertical deflection winding 41, the other end of which is coupled through an AC current feedback resistor 44 to a terminal 45. A first coupling capacitor 46 is coupled between terminal 45 and ground and a second coupling capacitor 47 is coupled between terminal 45 and the $+V_{cc}$ supply. This dual coupling capacitor arrangement serves to AC couple the deflection winding 41 to the $+V_{cc}$ supply and ground, with a reduction of peak current drawn from the $+V_{cc}$ supply. Thus, the $+V_{cc}$ supply filter requirements are reduced and there is greatly reduced ripple on the $+V_{cc}$ supply voltage, enabling its satisfactory use in energizing other stages, such as the video stages, of the television receiver. This dual coupling capacitor and its advantages are described in copending U.S. Pat. application Ser. No. (281,192), filed concurrently now abandoned, for Todd J Christopher and entitled "PUSH-PULL AMPLIFIER HAVING LOW PEAK POWER REQUIREMENTS."

During operation of the circuit of FIG. 5 as thus far described, the negative sync pulses 73 coupled to the base electrode of transistor 28 cause it to conduct. This starts the retrace interval of the deflection cycle. While conducting, transistor 28 provides a discharge path for the negative charge stored in capacitor 51. Capacitor 50 is coupled between the emitter electrode of transistor 28 and terminal 45 to ensure quick discharge of capacitor 51 during retrace. As the bottom terminal of capacitor rises to a positive potential, transistor 31 and 34 are rendered nonconducting. The positive-going signal at the collector of transistor 34 abruptly interrupts the negative-going sawtooth of current coupled to the deflection winding 41 from output terminal 40 of the complementary symmetry amplifier comprising transistors 36 and 37. As current through the deflection winding ceases, the magnetic field collapses and a relatively large amplitude positive retrace pulse shown in voltage waveform 76 is developed across the winding. At the end of the negative vertical sync pulse 73, transistor 28 is rendered nonconducting and capacitor 51 charges through resistors 58 and 59 from capacitors 46 and 47, which provide a temporary power source for the charging during the trace interval providing the negative-going sawtooth waveform 74, which is coupled through amplifying transistors 31 and 34 to the complementary symmetry transistors 36 and 37 to form the trace interval of the deflection cycle.

The remaining features of the vertical deflection circuit of FIG. 5 will be described in the following separately-headed sections to clarify the function of the circuit elements. Although described in several sections, it is to be understood that the several features are advantageously, but not necessarily, used together in a vertical deflection circuit embodying the invention.

REDUCTION OF POWER REQUIREMENTS OF THE DEFLECTION CIRCUIT

Waveform 76 is a voltage waveform required to drive the yoke and reverse the current in it during the retrace interval. Normally, the $+V_{cc}$ supply voltage would have to be selected large enough to supply this peak-to-peak voltage. However, this large voltage supply would greatly increase the dissipation in the complementary symmetry amplifier. A more efficient solution is provided in accordance with one embodiment of the invention in FIG. 5 by allowing the yoke voltage to rise much higher than the $+V_{cc}$ supply voltage during a first portion of the retrace interval and by recovering this voltage and returning it to the deflection circuit in a second portion of the retrace interval as described in conjunction with FIGS. 3 and 4. A diode 38 having its anode coupled to the $+V_{cc}$ supply and its cathode coupled to the collector electrode of transistor 36 allows the positive retrace voltage developed across winding 41 to rise higher than the $+V_{cc}$ supply voltage. Operation of the transistor 36 during the trace interval is not affected as current for the transistor flows in a forward direction through diode 38. A diode 54 having its anode coupled to output terminal 40 and its cathode coupled to the collector electrode of transistor 36 is poled to conduct the positive peaks of the retrace voltage waveform 76. A retrace capacitor 55 coupled between the collector electrode of transistor 36 and the $+V_{cc}$ supply stores the energy passed by diode 54 during a first portion of the retrace interval and supplies it to the circuit during a second portion of the retrace interval. Specifically, diode 54 conducts during the first portion of the retrace pulse, charging capacitor 55 which is selected to resonate with deflection winding 41. During a second portion of the retrace interval, cpaacitor 55 discharges through transistor 36, returning energy to deflection winding 41. During this time diode 38 effectively disconnects the deflection circuit from the $+V_{cc}$ supply. The developed voltage on capacitor 55 enables the yoke current to reverse during the relatively short 1 millisecond retrace interval. At the same time the output transistors 36 and 37 do not dissipate energy because, while capacitor 55 is being charged by the relatively high voltage (about +55 volts), retrace pulse transistor 36 is effectively bypassed by diode 54. During discharge of capacitor 55, transistor 36 becomes saturated. Transistor 36 remains saturated until the deflection winding current reaches its peak and the trace interval begins. Thus, transistors 36 and 37 are not subjected to high dissipation modes of operation and may be selected to have relatively low power dissipation ratings, resulting in a significant cost saving in the manufacture of a television receiver embodying the pulse recovery circuit. In this manner the complementary symmetry amplifier average power requirements from the $+V_{cc}$ supply is substantially reduced. Further, the utilization of the dual coupling capacitors 46 and 47 in the circuit as described above reduces the peak power requirements of the circuit. Resistor 42 and capacitor 43 serially coupled across deflection winding 41 serve to damp ringing caused by high frequency components in the voltage waveform 76.

AC AND DC FEEDBACK

It is desirable to utilize feedback techniques in order to produce a raster on the picture tube viewing screen with the desired linearity. AC current feedback is provided from the junction of resistor 42 and deflection winding 41, through diode 52 to the emitter electrode of transistor 31. The feedback voltage developed across resistor 44 is bypassed to some degree by the coupling capacitors 46 and 47. The DC feedback is from output terminal 40 through deflection winding 41 and diode 52 to the emitter electrode of transistor 31. Diode 52 and resistor 33, coupled between the emitter electrode of transistor 31 and the B+ supply, offset the $V_{BE}$ drop of transistor 31. The bias at the base electrodes of transistors 36 and 37 at the beginning of the trace interval is determined by the voltage at the base of transistor 31. The base voltage of transistor 31 at this time is determined by the voltage to which capacitor 51 has discharged during the retrace interval. The capacitor 51 voltage, in turn, at this time is determined by the voltage at the junction of resistors 29 and 30 in the emitter circuit of discharge transistor 28. As previously mentioned, there is DC feedback from output terminal 40 through winding 41 and diode 52 to the emitter of transistor 31, which, accordingly, has its collector potential determined by the combined base and emitter voltages.

SELF-OSCILLATING FEATURE

It is customary to have the vertical deflection stage self-oscillating at the vertical deflection rate so that the raster can be maintained during momentary dropouts of the vertical sync pulses. During normal operation the vertical sync pulses trigger the oscillator stage. In FIG. 5 transistor 28 and its associated circuit elements comprises the oscillator stage. Feedback is provided from the output stages to the discharge transistor 28 to maintain the oscillations. A first oscillator feedback path is from the collector electrode of transistor 34 through potentiometer 62, resistor 61 and resistor 49 to the base electrode of transistor 28. The voltage waveform 75 at the collector of transistor 34 comprises a negative-going sawtooth with a positive retrace pulse portion. The positive retrace portion of the feedback signal is of the wrong polarity to cause transistor 28 to conduct so normal multivibrator type oscillations are not possible. Instead, transistor 28 is utilized in an overdriven phase-shift type of oscillator. Capacitors 48 and 72 in conjunction with resistors 61, 62 and 49 provide a lagging phase shift to the feedback signal. This phase shift, in conjunction with the further phase shift provided by capacitor 51, results in oscillation of the stage. Potentiometer 62 determines the rate at which capacitor 48 charges and therefore can vary the frequency of oscillations. Hence, potentiometer 62 serves as a vertical hold control.

By returning capacitor 72 to resistor 39 in the collector circuit of transistor 37, a small amount of direct positive feedback is obtained, which greatly enhances the speed at which transistor 28 is turned on.

Serially coupled resistor 56 and diode 57 are coupled between output terminal 40 and the base electrode of transistor 28. Diode 57 is poled to pass a portion of the positive retrace pulse which positively charges capacitor 48 during retrace. This provides a large waveform at the base electrode of transistor 28 and results in more stable operation.

Resistors 58 and 59 are in the charging circuit for the sawtooth generating capacitor 51. The voltage across resistors 58 and 59 includes a DC bias developed by resistors 29 and 30, the sawtooth component and a parabolic component developed across the coupling capacitors 46 and 47, capacitors 46 and 47 serving to integrate the sawtooth voltage developed across the deflection winding 41. A resistor 60 coupled from output terminal 40 to the junction of resistors 58 and 59 couples a small amount of sawtooth voltage to the junction, thereby cancelling the sawtooth component across resistor 58. The remaining parabolic component is of the proper form to provide "S-shaping" at no additional expense in circuitry. The size of the parabolic component, and thus the amount of "S-shaping," can be adjusted by changing the value of coupling capacitors 46 and 47.

RETRACE BLANKING CIRCUIT

One way of achieving blanking in a television receiver is to apply negative pulses to the control grid of the picture tube during the horizontal and vertical retrace intervals. The transformerless vertical deflection circuit in FIG. 5 does not have a negative vertical retrace pulse available. Further, the retrace interval extends longer than the ringing pulse on the yoke. What is needed is a blanking waveform which extends from the end of one trace interval to the beginning of the next. In FIG. 5, transistors 31 and 34 are cut off during this interval. The cut-off condition of transistor 34 is utilized to control the blanking circuit including transistor 63 by coupling the emitter electrode of transistor 34 to the emitter electrode of transistor 63. The base electrode of transistor 63 is grounded.

A source such as the horizontal output transformer, not shown, provides negative horizontal blanking pulses 77 coupled to a terminal 69. Terminal 69 is coupled through resistors 67, 68 and a diode 66 to the collector electrode of transistor 63. A capacitor 65 is coupled between the collector electrode and ground. The negative horizontal blanking pulses 77 coupled through diode 66 charges capacitor 65 negatively. As long as transistor 34 is conducting, transistor 63 is also conducting and capacitor 65 discharges therethrough after each incoming horizontal pulse. During the vertical retrace interval transistor 34 is cut off, cutting off transistor 63 and allowing capacitor 65 to remain negatively charged as the quick discharge path through the transistors is open. During this period the vertical negative blanking pulse is thereby developed. The composite negative vertical and horizontal blanking signal 78 is coupled through a resistor 70 to a terminal 71 which is adapted to be coupled to the control electrode of the picture tube.

A successful embodiment of the circuit of FIG. 5 incorporated in a black and white television receiver utilizing a 5V picture tube utilizes the following circuit element values and types:

| | |
|---|---|
| Transistor 28 | 2N4249 |
| Transistor 31 | 2N4249 |
| Transistor 34 | MPSH05 |
| Transistor 36 | MPS A05 |
| Transistor 37 | MPS A56 |
| Transistor 63 | 2N4249 |
| Diode 38 | 1N4002 |
| Diode 52 | FDH 600 |
| Diode 54 | 1N4002 |
| Diode 57 | FDH 600 |
| Diode 66 | FD 222 |
| Capacitor 26 | 0.001 μf |
| Capacitor 43 | 0.01 μf |
| Capacitor 46 | 100 μf |
| Capacitor 47 | 100 μf |
| Capacitor 48 | 0.047 μf |
| Capacitor 50 | 47 μf |
| Capacitor 51 | 0.1 μf |
| Capacitor 55 | 0.47 μf |
| Capacitor 65 | 100 μμf |
| Capacitor 72 | 0.0047 μf |
| Resistor 27 | 560 KΩ |
| Resistor 29 | 10 KΩ |
| Resistor 30 | 15 KΩ |
| Resistor 32 | 100 KΩ |
| Resistor 33 | 560 KΩ |
| Resistor 35 | 270 Ω |
| Resistor 39 | 6.8 Ω |
| Resistor 42 | 1.8 KΩ |
| Resistor 44 | 5.6 Ω |
| Resistor 49 | 180 KΩ |
| Resistor 53 | 47 KΩ |
| Resistor 56 | 100 KΩ |
| Resistor 58 | 1.5 MΩ |
| Resistor 59 | 820 KΩ |
| Resistor 60 | 3.9 MΩ |
| Resistor 61 | 150 KΩ |
| Resistor 62 | 200 KΩ |
| Resistor 67 | 6.8 KΩ |
| Resistor 68 | 3.9 KΩ |
| Resistor 70 | 22 KΩ |
| Resistor 79 | 2.7 KΩ |

What is claimed is:

1. A deflection circuit comprising:
output amplifier means including a pair of serially coupled transistors;
a source of deflection drive signals coupled to the input electrodes of said pair of transistors, said signals causing said amplifier to operate for defining trace and retrace intervals during each deflection scanning cycle;
a deflection winding coupled to an output terminal of said amplifier;
a source of operating potential;
first unidirectional current conducting means serially coupled between said source and a terminal in the series conduction path of said amplifier for providing operating current thereto;
energy storage means coupled to said source and to said terminal in said conduction path; and
second unidirectional current conducting means coupled to said deflection winding and to said terminal in said conduction path and poled to conduct current during a first portion of said retrace interval of said deflection cycle for supplying energy to said energy storage means, said energy storage means supplying said stored energy to said amplifier stage during a second portion of said retrace interval of said deflection cycle.

2. A deflection circuit according to claim 1 wherein said energy storage means includes a capacitor.

3. A deflection circuit according to claim 2 wherein said pair of serially coupled transistors are of opposite conductivity types and wherein the emitter electrode of one transistor is coupled to the emitter electrode of the other transistor.

4. A deflection circuit according to claim 3 wherein said first unidirectional current conducting means is a diode and said terminal in said series conduction path is in the collector circuit of one of said transistors.

5. A deflection circuit comprising:
a push-pull amplifier stage comprising first and second serially coupled transistors;
a source of operating potential;

first unidirectional current conducting means serially coupled between said source of operating potential and said serially coupled transistors and poled for providing a path for operating current from said source to said transistors;

a deflection winding coupled to the junction of said first and second transistors;

a signal source coupled to the input electrodes of said first and second transistors and providing deflection drive signals for controlling the conduction of said first and second transistors for defining trace and retrace intervals during each deflection cycle, a retrace voltage pulse being developed across said deflection winding during said retrace interval, said retrace pulse being of a greater magnitude than said source of operating potential;

a second unidirectional current conducting device coupled from the junction of said first and second transistors to the terminal of said first unidirectional current conducting device remote from said source of operating potential and poled for conducting said retrace pulse; and energy storage means coupled to the junction of said first and second unidirectional current conducting devices and to a point of reference potential, said storage means operating in a resonant manner with said deflection winding for storing energy from said retrace pulse during a first portion of said retrace interval and supplying operating current to said amplifier during a second portion of said retrace interval.

6. A deflection circuit according to claim 5 wherein said first and second unidirectional current conducting means are diodes and said energy storage means is a capacitor.

7. A deflection circuit according to claim 6 wherein said first and second transistors are of opposite conductivity types arranged for forming a complementary symmetry amplifier stage.

8. A deflection circuit according to claim 7 wherein the respective emitter electrodes of said first and second transistors are coupled together and said first diode is coupled between said source of operating potential and the collector electrode of one of said first and second transistors.

9. A deflection circuit in which the retrace pulse voltage, having a potential greater than the supply voltage providing operating current to the circuit, developed across a deflection winding is recovered and returned to the deflection circuit during the retrace interval, said circuit comprising:

an amplifier including two serially coupled transistors having their output electrodes coupled together, the junction of said output electrodes forming an output terminal;

a source of deflection signals coupled to the input electrodes of said transistors for controlling the conduction thereof for defining trace and retrace intervals during each deflection cycle;

a source of operating potential;

a first diode serially coupled between said source of operating potential and said serially coupled transistors and poled for providing operating current thereto;

a deflection winding coupled to said output terminal;

capacitive means coupled between the junction of said first diode and said transistors and a point of reference potential and selected to resonate with said winding during said retrace interval; and a second diode coupled between said output terminal and said terminal of said capacitive means remote from said point of reference potential and poled for conducting said retrace pulse voltage for charging said capacitive means during a first portion of said retrace interval when current is in a first direction in said deflection winding, said capacitive means discharging through one of said transistors to said deflection winding when current is in the other direction in said winding during a second portion of said retrace interval.

* * * * *

UNITED STATES PATENT OFFICE

CERTIFICATE OF CORRECTION

Patent No. 3,784,857 Dated January 8, 1974

Inventor(s) Todd J Christopher

It is certified that error appears in the above-identified patent and that said Letters Patent are hereby corrected as shown below:

Col. 2, line 1, "trace" should read -- retrace --.
Col. 7, line 40, "cpaacitor" should read -- capacitor --.

Signed and sealed this 7th day of May 1974.

(SEAL)
Attest:

EDWARD M.FLETCHER,JR.
Attesting Officer

C. MARSHALL DANN
Commissioner of Patents